(12) United States Patent
Spiegel et al.

(10) Patent No.: US 7,912,756 B2
(45) Date of Patent: Mar. 22, 2011

(54) METHOD AND SYSTEM FOR ELECTRONIC COMMERCE USING MULTIPLE ROLES

(75) Inventors: Joel R. Spiegel, Woodinville, WA (US); Maryam Mohit, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 11/537,410

(22) Filed: Sep. 29, 2006

(65) Prior Publication Data

US 2007/0078727 A1    Apr. 5, 2007

Related U.S. Application Data

(63) Continuation of application No. 10/212,367, filed on Aug. 5, 2002, now Pat. No. 7,716,088, which is a continuation of application No. 09/104,942, filed on Jun. 25, 1998, now Pat. No. 6,629,079.

(51) Int. Cl.
*G06Q 30/00* (2006.01)
(52) U.S. Cl. .......................................... 705/26; 705/27
(58) Field of Classification Search .................... 705/26, 705/27
See application file for complete search history.

(56) References Cited

U.S. PATENT DOCUMENTS

| | | | |
|---|---|---|---|
| 4,996,642 A | 2/1991 | Hey | |
| 5,173,594 A | 12/1992 | McClure | |
| 5,319,542 A * | 6/1994 | King et al. | 705/27 |
| 5,555,496 A | 9/1996 | Tackbary et al. | |
| 5,621,812 A | 4/1997 | Deaton et al. | |
| 5,664,110 A | 9/1997 | Green | |
| 5,710,887 A | 1/1998 | Chelliah | |
| 5,745,096 A | 4/1998 | Ludolph et al. | |

(Continued)

FOREIGN PATENT DOCUMENTS

CA    2236015    5/1997

(Continued)

OTHER PUBLICATIONS

Brooker, Dena, "Purchasing cards": the next generation, Modern purchasing, Jun. 1997.*

(Continued)

*Primary Examiner* — Mark Fadok
(74) *Attorney, Agent, or Firm* — Knobbe, Martens, Olson & Bear, LLP

(57) ABSTRACT

A computer system for conducting electronic commerce. The system provides multiple electronic shopping carts for each user. Each electronic shopping cart has an indication of items currently within the electronic shopping cart and billing and shipment information. The system generates a display that identifies each of the electronic shopping carts and sends the generated display to a user computer system. The system then receives a selection of one of the identified electronic shopping carts from the user computer system and receives a selection of an item from the user computer system. In response to receiving the selection of the item, the system adds the item to the selected electronic shopping cart. The system then receives an indication to checkout the items in the selected electronic shopping cart from the user computer system. In response to receiving the indication to checkout, the system ships the items in the selected electronic shopping cart in accordance with the shipment information of the selected electronic shopping cart and bills for the items in the selected electronic shopping cart in accordance with the billing information for the selected electronic shopping cart. The system thus allows a user to select each of the electronic shopping carts for adding items to each electronic shopping cart.

24 Claims, 11 Drawing Sheets

U.S. PATENT DOCUMENTS

| | | | |
|---|---|---|---|
| 5,745,681 A | | 4/1998 | Levine et al. |
| 5,758,327 A | | 5/1998 | Gardner et al. |
| 5,774,874 A | * | 6/1998 | Veeneman et al. ............. 705/27 |
| 5,790,426 A | * | 8/1998 | Robinson ...................... 702/179 |
| 5,826,245 A | | 10/1998 | Sandberg-Diment |
| 5,845,260 A | * | 12/1998 | Nakano et al. ................... 705/26 |
| 5,864,830 A | * | 1/1999 | Armetta et al. ................. 705/41 |
| 5,870,717 A | | 2/1999 | Wiecha |
| 5,905,973 A | | 5/1999 | Yonezawa et al. |
| 5,907,831 A | * | 5/1999 | Lotvin et al. .................... 705/14 |
| 5,918,213 A | | 6/1999 | Bernard et al. |
| 5,953,710 A | * | 9/1999 | Fleming .......................... 705/38 |
| 5,960,411 A | | 9/1999 | Hartman |
| 5,963,939 A | * | 10/1999 | McCann et al. ................... 707/4 |
| 5,970,474 A | * | 10/1999 | LeRoy et al. .................... 705/27 |
| 5,970,475 A | | 10/1999 | Barnes et al. |
| 6,014,638 A | | 1/2000 | Burge et al. |
| 6,021,943 A | * | 2/2000 | Chastain ....................... 235/379 |
| 6,023,682 A | * | 2/2000 | Checchio ......................... 705/18 |
| 6,061,057 A | | 5/2000 | Knowlton et al. |
| 6,092,049 A | | 7/2000 | Chislenko et al. |
| 6,125,352 A | * | 9/2000 | Franklin et al. ................. 705/26 |
| 6,125,353 A | | 9/2000 | Yagasaki |
| 6,193,155 B1 | * | 2/2001 | Walker et al. ................. 235/381 |
| 6,266,649 B1 | | 7/2001 | Linden et al. |
| 6,289,322 B1 | | 9/2001 | Kitchen et al. |
| 6,292,789 B1 | | 9/2001 | Schutzer |
| 6,317,722 B1 | | 11/2001 | Jacobi et al. |
| 6,473,738 B1 | | 10/2002 | Garrett |
| 6,490,567 B1 | * | 12/2002 | Gregory .......................... 705/39 |
| 6,615,189 B1 | * | 9/2003 | Phillips et al. .................. 705/41 |
| 6,629,079 B1 | | 9/2003 | Spiegel et al. |
| 6,850,899 B1 | | 2/2005 | Chow et al. |
| 6,850,917 B1 | | 2/2005 | Hom et al. |
| 6,873,971 B1 | | 3/2005 | Tackbary et al. |
| 6,876,977 B1 | | 4/2005 | Marks |
| 7,542,924 B2 | | 6/2009 | Chow et al. |
| 2004/0034568 A1 | * | 2/2004 | Sone ............................... 705/26 |
| 2004/0215534 A1 | * | 10/2004 | Gautier et al. .................. 705/30 |
| 2005/0131772 A1 | | 6/2005 | Chow et al. |
| 2006/0122895 A1 | | 6/2006 | Abraham et al. |
| 2007/0078727 A1 | * | 4/2007 | Spiegel et al. .................. 705/26 |

FOREIGN PATENT DOCUMENTS

| | | |
|---|---|---|
| CA | 2246933 | 3/1999 |
| EP | 0 798 655 | 10/1997 |
| EP | 11 70690 | 1/2002 |
| JP | 09330355 | 12/1997 |
| JP | 10091684 | 4/1998 |
| JP | 10105599 | 4/1998 |
| JP | 10105600 | 4/1998 |
| WO | WO97/02537 | 1/1997 |
| WO | WO97/40446 | 1/1997 |

OTHER PUBLICATIONS

Dufek, Andy, "Censorship does not compute", The atlanta Journal-Constiitution, Jun. 23, 1996.*
VirtualShoppingMall1, Rejean Labbe, "What are cookies", Google Groups, dated Jan. 10, 1997.*
VirtualShoppingMall2, Shane Crowley, "CGI Scripts", Google Groups dated Aug. 16, 1997.*
VirtualShoppingMall3, William Drews, "Mall Storefront of your own", Google Groups, dated Mar. 8, 1998.*
Caillouet, Karl A., "Don't like cookies? This takes the buscuit!", Google Groups, Dated May 20, 1997.*
Weigand, Garry, "Watchdogs want cookie jar clampdown", Google Groups, dated Apr. 10, 1997.*
Baron, Chris, "Electronic Commerce with SoftCart," Web Techniques, Oct. 1996.
Hoque, Reaz, "Shopping Cart Application with JavaScript," Web Technique, vol. 3, May 1998.
Little, Thomas, "Commerce on the Internet," IEEE Multimedia, vol. 1., No. 4, Jan. 1994.
Gallagher, Katherine and Parsons, Jeffrey, "A Framework for Targeting Banner Advertising on the Internet," Proceedings of the Thirtieth Hawaii International Conference on System Sciences, vol. 4, pp. 265-274, Jan. 7-10, 1997.
Tilson, Roger et al., "A Comparison of Two Current E-Commerce Sites," Sixteenth Annual International Conference of Computer Documentation, Conference Proceedings, Scaling the Heights: Future of Information Technology, Proceedings of ACM SIGDOC 1988 Conference, Sep. 23-26, 1998.
http://www.netgrocer.com/help.cfm?title [Accessed Jun. 24, 1998].
MiniVend 2.03 Documentation, Jan. 8, 1997 www.minivend.com/minivend/.
Cowart, Robert, "Mastering Windows 95," Introduction and Chapters 1, 5, 7, 12, 26, 38, Sybex, Inc., Mar. 1997.
Ivens, Kathy & Barich, Thomas E., "Discover American Online," Chapters 1 and 3, IDG Books Worldwide, Inc., Mar. 1997.
Unknown Author, "LiveOffice Corp. Adds Online Shopping Cart Monitoring Feature to LiveSiteManager," PR Newswire, Jul. 14, 2003.
E-mail Communication S. R. Callicutt, DMV to put Social Security Numbers on Driver's Licenses, 1 page, Jul. 19, 1994.
E-mail Communication C Moore, Bill printed part of my Calling Card Number, 2 pages, Oct. 14, 1993.
E-mail Communication Hamilton Richards Jr., Final Grades, 1 page, Dec. 19, 1994.
Los Angeles Times, FED Moves on ATM Fraud: Rule on Customer Receipts amended to Thwart Thieves, Business, Part D, p. 3 of Mar. 17, 1995.
Anonymous, "I can get it for you wholesale". Credit Card Management. Nov. 1995: 8.8; Proquest Central, p. 10.
Schorow S. Cybersybils have personalities all their own: [01 Edition]; Boston Herald, Boston, Mass.: Jan. 30, 1995. p. 027 [Retrieved Sep. 17, 2008 from ProQuest Central database] (Document ID: 19654287).
JIPO Office Action dated Apr. 10, 2009 (with English translation) in Japanese Patent Application No. 2000-556297.
Baron, "Implementing a web shopping cart", Dr. Dobbs Journal, pp. 64, 66, 68, 69, 83-85, Sep. 1996.
Friesenhahn, "Writing Javascript Applications", Byte, pp. 59-60, Feb. 1998.
Marable et al., "Accurate Wayfinding with JavaScript," Web Techniques, pp. 73-75, Jul. 1997.
Tichenor, "JavaScript Cookies", Dr. Dobb's Journal, pp. 1-7, May 1997.
EPO Summons/Office Action dated Aug. 7, 2009 in European Patent Application No. 99935358.4.
Hitachi, Translations of Japanese Patent Applications Laid-open Nos. 10-105600 dated Apr. 24, 1998, 10-093055 dated Dec. 12, 1997, and 10-091684 dated Apr. 10, 1998.

* cited by examiner

User Table

| USER ID | NAME | E-MAIL | · · · |
|---|---|---|---|
| J. Smith | Smith, J. | jsmith@... | |
| J. Doe | Doe, J. | jdoe@... | |
| • | | | |
| • | | | |
| • | | | |

501

Context Mapping Table

| USER ID | CONTEXT ID |
|---|---|
| J. Smith | 204 |
| J. Smith | 220 |
| J. Doe | 229 |
| J. Doe | 205 |
| J. Doe | 175 |
| • | • |
| • | • |
| • | • |

502

Context Table

| CONTEXT ID | NAME | ADDRESS | · · · |
|---|---|---|---|
| 175 | Work | 4215... | |
| 204 | Johnny's | | |
| 205 | Fiction | | |
| 220 | Mother-in-law | | |
| 229 | Non-fiction | | |
| • | • | | |
| • | • | | |
| • | • | | |

METHOD AND SYSTEM FOR ELECTRONIC COMMERCE USING MULTIPLE ROLES

CROSS-REFERENCE TO RELATED APPLICATIONS

This application is a continuation of U.S. patent application Ser. No. 10/212,367 filed Aug. 5, 2002 which is a continuation of U.S. patent application Ser. No. 09/104,942 filed Jun. 25, 1998 (now U.S. Pat. No. 6,629,079 issued Sep. 30, 2003).

TECHNICAL FIELD

The present invention relates to a computer method and system of electronic commerce and, more particularly, to a method and system for selecting items to order using a "shopping cart" model.

BACKGROUND OF THE INVENTION

The Internet is increasingly being used to conduct "electronic commerce," because it comprises a vast number of computers and computer networks that are interconnected through communication links which facilitates electronic communications between vendors and purchasers. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and wide-spread use of electronic commerce depends, in large part, upon the ease-of-use of conducting such electronic commerce. If electronic commerce can be easily conducted, then even the novice computer user will choose to use electronic commerce. Therefore, it is important that techniques be developed to facilitate conducting electronic commerce.

The Internet provides a network that facilitates conducting electronic commerce because it uses standardized techniques for exchanging information.

Many standards have been established for exchanging information over the Internet, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is typically a special-purpose application program that effects the requesting of Web pages and the displaying of Web pages.

Currently, Web pages are generally defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web portion of the Internet is especially conducive to conducting electronic commerce. Many Web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming Web page to the client computer system and schedules shipment of the items.

The selection from the electronic catalogs of items to be purchased is generally based on a "shopping cart" or "shopping basket" model. When the purchaser selects an item, the server computer system metaphorically adds that item to a shopping cart. The server computer system provides Web pages that allow the purchaser to view and change the quantities of the items in the shopping cart. When the purchaser is satisfied with the items in the shopping cart, the purchaser "checks out" the items that are in the shopping cart. The purchaser may provide billing and shipment information as part of "check out" process. When check out is complete, the items are then shipped in accordance with the shipment information, and the purchaser is billed in accordance with the billing information.

Although the shopping cart model facilitates the purchasing of items via electronic commerce, purchasing items via electronic commerce can still be cumbersome. First, a single purchaser may use different billing and shipment information at different times. For example, when purchasing items for use in the workplace, the purchaser may use a company credit card and the company's shipping address. In contrast, when purchasing items for personal use, the purchaser may use a personal credit card and a home address for shipping. It may be cumbersome to re-enter such information or re-select such information when the purchaser is purchasing for workplace or home use. Second, server computer systems may customize recommendations for items to purchase based on the purchasing or, more generally, access patterns of a user. For example, if a user generally purchases books relating to current politics, then when the user next connects to the server computer system, it may recommend that the user purchase a recently released book on current politics. However, if the purchaser purchases different types of items at work from the types of items purchased at home, then the server computer system may make inappropriate recommendations at certain times. For example, the server computer system may recommend a book on current politics when the user is at work looking for books on computer software.

SUMMARY OF THE INVENTION

Embodiments of the present invention provide a method and system for conducting electronic commerce with multiple electronic commerce contexts and more generally for interacting with a computer system with multiple interaction contexts. The electronic commerce system embodiment provides multiple electronic commerce contexts (e.g., "shopping carts") for each user. Each electronic commerce context has associated information relating to electronic commerce conducted while the user was in that electronic commerce context. The electronic commerce system receives from the user a selection of one of the electronic commerce contexts. After receiving the selection of the one of the electronic commerce contexts, the electronic commerce system conducts electronic commerce with the user. The electronic commerce system associates, with the selected electronic commerce context, information relating to the electronic commerce conducted with the user so that when the user subsequently selects that electronic commerce context, the associated information is available for conducting subsequent electronic commerce. In this way, a user can use various electronic commerce contexts without having to re-specify information (e.g., billing information) relating to the various electronic commerce contexts.

In one embodiment, the electronic commerce system uses a multiple shopping cart model for each user conducting electronic commerce. Each shopping cart is intended to be used when a user is purchasing items in a different "role" or different electronic commerce context. For example, one shopping cart can be used when the user is acting in a workplace role purchasing items for work, and another shopping cart can be used when the user is acting in a personal role purchasing items for personal use. The electronic commerce system allows the user to select the shopping cart that is appropriate for the user's current role. As the user selects items to be purchased, the electronic commerce system adds the items to the currently selected shopping cart. Each shopping cart has associated with it information that is related to the role that the user is in when the shopping cart is used. This information may include billing and shipment information. In this way, when a user conducts electronic commerce in different roles, the user can select the shopping cart that already has the appropriate billing and shipment information. In addition, the electronic commerce system can track the electronic commerce activity of the user in each separate role (i.e., each shopping cart) and customize advertising and recommendations based on activity performed while the user was in that role.

BRIEF DESCRIPTION OF THE DRAWINGS

FIG. 5 is a block diagram illustrating a sample data structure for storing electronic commerce context ("ECC") profile information.

DETAILED DESCRIPTION OF THE INVENTION

Figure 1:
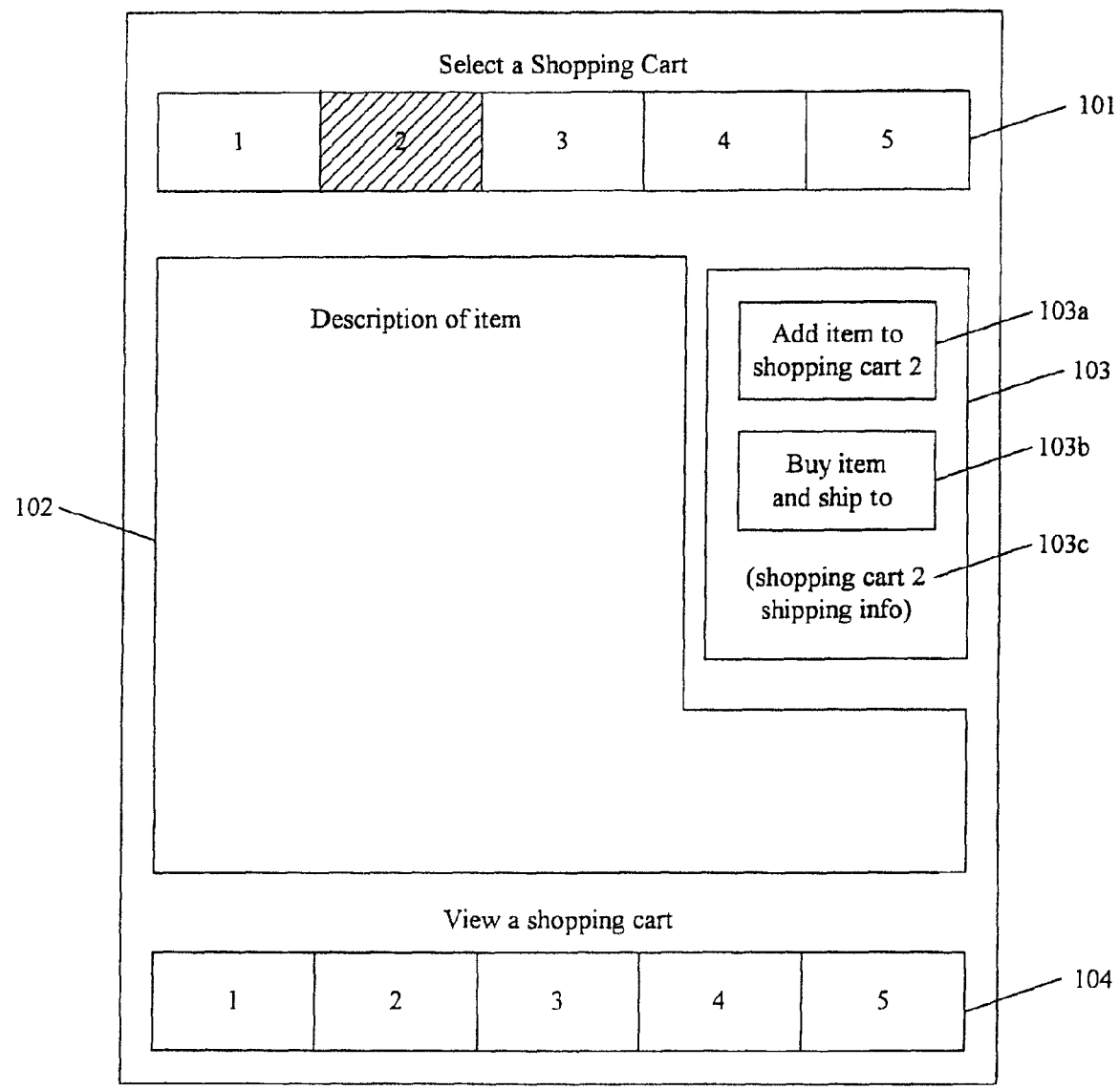
FIG. 1 is a diagram of the display illustrating the use of a shopping cart for each electronic commerce context.

An embodiment of the present invention provides a method and system that uses a multiple shopping cart model for each user conducting electronic commerce. Each shopping cart is intended to be used when a user is purchasing items in a different "role." For example, one shopping cart can be used when the user is acting in a workplace role purchasing items for work, and another shopping cart can be used when the user is acting in a personal role purchasing items for personal use. The system of the present invention allows the user to select the shopping cart that is appropriate for the user's current role. As the user selects items to be purchased, the system adds the items to the currently selected shopping cart. Each shopping cart has associated with it information that is related to the role that the user is in when the shopping cart is used. This information may include billing and shipment information. When a user conducts electronic commerce in different roles, the user can select the shopping cart that already has the appropriate billing and shipment information. In this way, the user can avoid having to re-specify billing and shipping information that is unique to a certain role. In addition, the system can track the electronic commerce activity of the user in each separate role (i.e., each shopping cart) and customize advertising and recommendations based on activity performed while the user was in that role.

In one embodiment, the system of the present invention provides a shopping cart selection navigation bar that allows the user to switch between shopping carts using a single action (e.g., a mouse click). The use of single-action switching between shopping carts greatly facilitates conducting the electronic commerce. The selection navigation bar has an area associated with each shopping cart. In one embodiment, the system displays the shopping cart selection navigation bar at the top of various displays (e.g., Web pages), such as a display that describes an item that can be purchased. By performing the single action, the user can quickly switch between separate shopping carts. When the user indicates to add an item to a shopping cart, the system adds the item to the currently selected shopping cart. A user may use the shopping cart selection navigation bar to conveniently place an item in multiple shopping carts. For example, if the user is purchasing items for, say, five relatives, then the user can set up one shopping cart for each relative. In such an example, each shopping cart will have shipment information for one of the relatives. When the selection navigation bar is displayed along with a description of an item, the user can select a shopping cart and then add the item to that shopping cart. The user can then select the next shopping cart and add the item to that shopping cart. This process of selecting and adding can be performed for each shopping cart. In this way, items can be added to multiple shopping carts with only two actions (e.g., two mouse clicks), that is, one action to select the shopping cart and one action to add the item to the currently selected shopping cart.

The system of the present invention also provides a shopping cart viewing navigation bar through which a user can select to view information relating to a certain shopping cart. When a shopping cart is selected from the viewing navigation bar, the system displays information describing the current contents of the selected shopping cart, information describing past orders that were checked out of that shopping cart, context naming information (e.g., suggestive of the role for which the shopping cart is used), and billing and shipment information. The user can then modify the contents of the shopping cart, check out the contents of the shopping cart, or update the information relating to the shopping cart. Alternatively, rather than having a separate viewing navigation bar that lists each shopping cart, a single button can be provided through which the user can view information relating to the currently selected shopping cart.

The system of the present invention is referred to as the multiple electronic commerce context system ("MECC" system) (or multiple shopping cart system in one embodiment) because each different role represents a different electronic commerce context in which a user conducts electronic commerce. In one embodiment, the MECC system uses a separate shopping cart for each electronic commerce context. However, one skilled in the art will appreciate that the principles of multiple electronic commercial contexts can be used independent of the shopping cart model. In general, each context can be considered to include an aggregation (e.g., items selected to purchase) and information relating to the aggregation (e.g., billing information). Different metaphors can be used to refer to the aggregations depending on the type of electronic commerce being conducted. For example, if the electronic commerce is the purchasing of books, then the aggregations may be referred to as separate "bookshelves" rather than shopping carts. In another example, the metaphor of "CD bins" may be used when the electronic commerce involves purchasing CDs. The MECC system allows a user to name each electronic commerce context so that the user can easily identify the electronic commerce contexts. For example, the user may name one of the electronic commerce contexts "Johnny's books," if the user uses that context to purchase books for Johnny. The MECC system also stores electronic commerce context ("ECC") profile information for each context. The ECC profile information includes information describing the contents of the shopping cart associated with that context, describing past orders submitted while in that context, and describing past activity electronic commerce activity while in that context.

FIG. 1 is a diagram of the display illustrating the use of a shopping cart for each electronic commerce context. The display includes the shopping cart selection navigation bar 101, item detailed description 102, selection box 103, and shopping cart viewing navigation bar 104. The selection navigation bar contains an area for each of five shopping carts or electronic commerce contexts. Each shopping cart is currently identified by a number between one and five. The shopping cart identified by numbered 2 is currently selected as indicated by shading. The item detailed description contains information describing the item currently selected by the user. This information may include pricing data, availability data, and a general description of the item. The selection box contains an add-to shopping cart button 103a and single-action ordering button 103b. The use of single-action ordering is described in U.S. patent application Ser. No. 08/928, 951 entitled "Method and System for Placing a Purchase Order Via a Communications Network," which is hereby incorporated by reference. The text 103c contains shipment information for the currently selected shopping cart as a reminder to the user. The viewing navigation bar contains an area for each shopping cart. Initially, it may be that no shopping carts or only one shopping cart has been defined. In which case, the selection navigation bar may be initially not displayed or displayed with one area. As a user dynamically adds and deletes shopping carts, the selection navigation bar is adjusted accordingly.

When a user selects a shopping cart from the selection navigation bar, the selected shopping cart becomes the current shopping cart, which changes the electronic commerce context. The information in the selection box is updated each time a different shopping cart is selected to reflect the currently selected shopping cart. When a user selects the add-to shopping cart button, the currently selected item is added to the currently selected shopping cart. When a user selects the single-action ordering button, an order is automatically placed for the currently selected item. That item is shipped and billed according to the shipment and billing information of the currently selected shopping cart. A user may view and update information relating to a shopping cart by selecting a shopping cart from the viewing navigation bar. Alternatively, the viewing navigation bar may be replaced by a single button that when selected allows the user to view and update information for the currently selected shopping cart.

Figure 2:
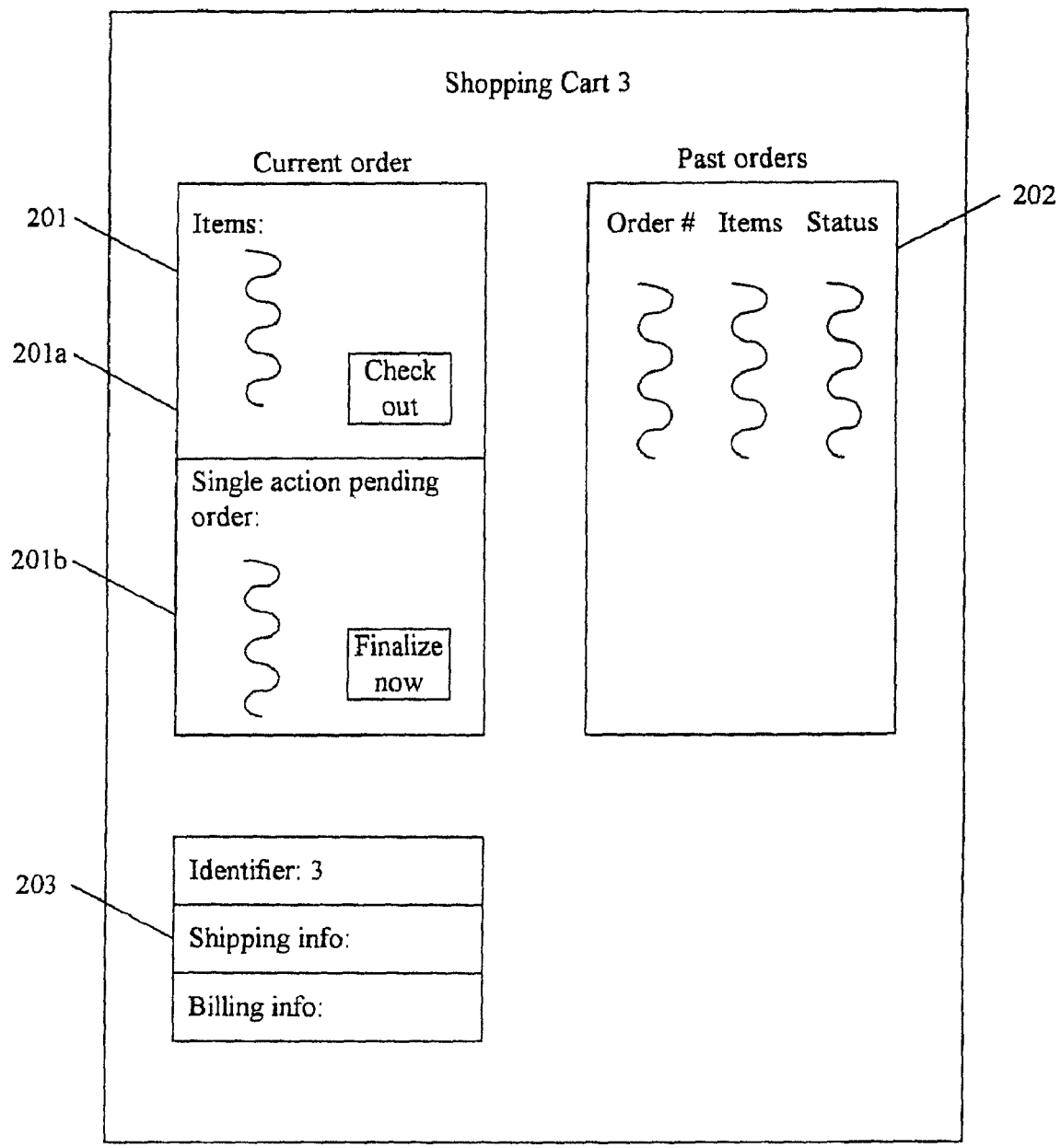
FIG. 2 is a diagram illustrating the display of shopping cart information.

FIG. 2 is a diagram illustrating the display of shopping cart information. The display contains a current order box 201, the past order box 202, and a general information box 203. The current order box contains information relating to items currently in the shopping cart that have not yet been checked out. The shopping cart sub-box 201a contains a listing of the items currently in the shopping cart. The user may modify the current order by changing the quantities of the items. The user places the order by selecting the checkout button within the shopping cart sub-box. When the current order is checked out, it becomes a past order and status information is displayed in the past orders box. The single-action pending order sub-box 201b contains a list of the items that have been selected using single-action ordering, but have not yet been finalized. Items selected using the single-action ordering technique are automatically finalized after a predetermined time (e.g., 60 minutes). Before that predetermined time has expired, the user may change the order or manually finalize the order using the "finalize now" button in the single-action pending order sub-box. Once the single-action order is checked out, it becomes a past order and status and information is displayed in the past orders box. The general information box contains information pertaining to the shopping cart. In this example, the information includes a user-changeable identifier field, shipping field, and billing field. The user can change the identifier, which defaults to numeric value, to text that is more meaningful to the user. For example, the user may change the identifier to the text "Johnny's books" if that shopping cart is used by the user to purchase books for Johnny.

Figure 3:
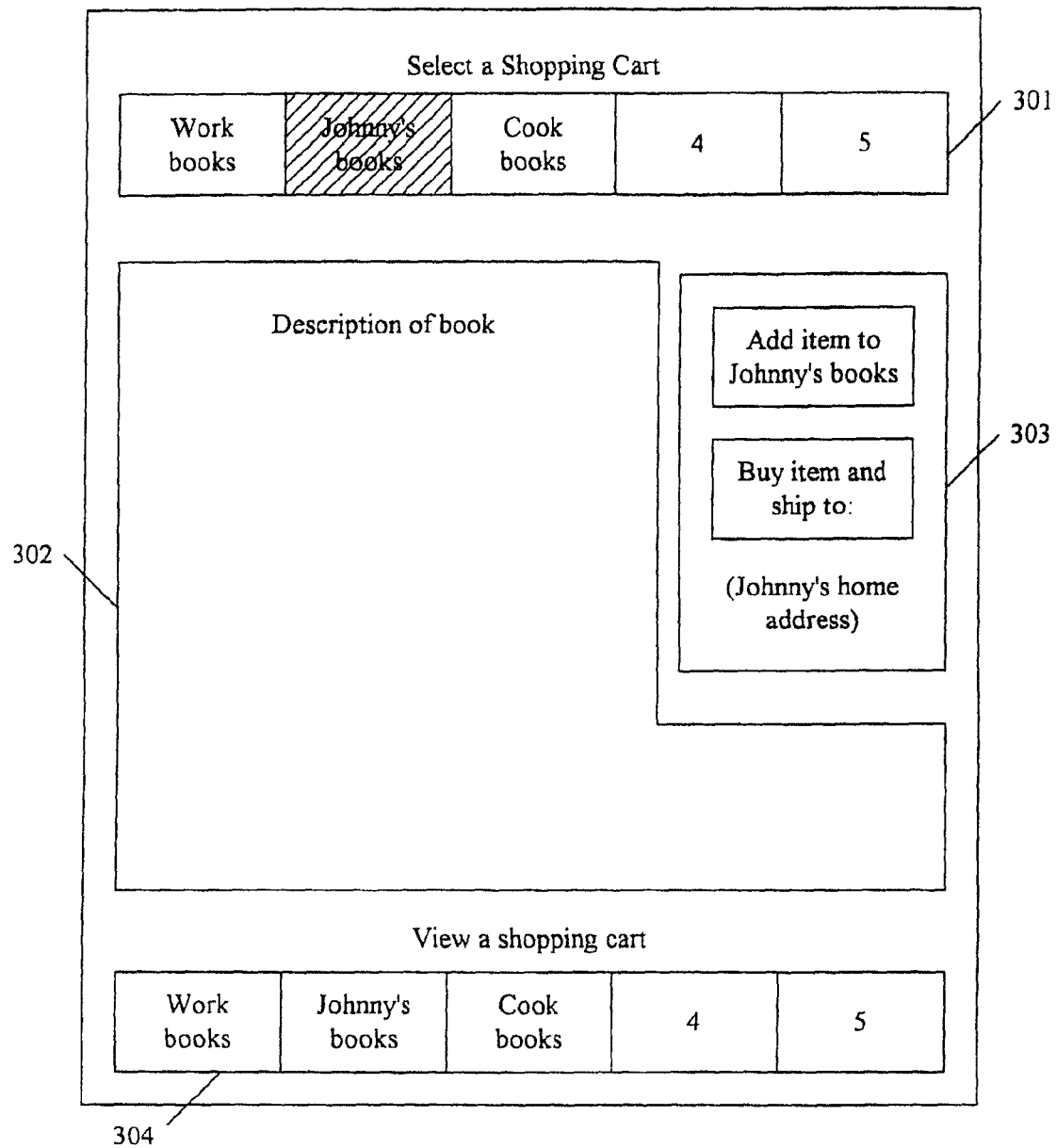
FIG. 3 is a diagram illustrating the display after a user has modified information relating to some of the shopping carts.

FIG. 3 is a diagram illustrating the display after a user has modified information relating to some of the shopping carts. In this example, the shopping cart selection navigation bar 301 indicates that the first three shopping carts have the identifiers "work books," "cookbooks," and "Johnny's books," respectively. The user has not modified the default identifier for shopping carts 4 and 5. The shopping cart viewing navigation bar 304 also indicates the updated identifiers. The information in the selection box 303 contains information relating to the currently selected shopping cart— "Johnny's books."

Figure 4:
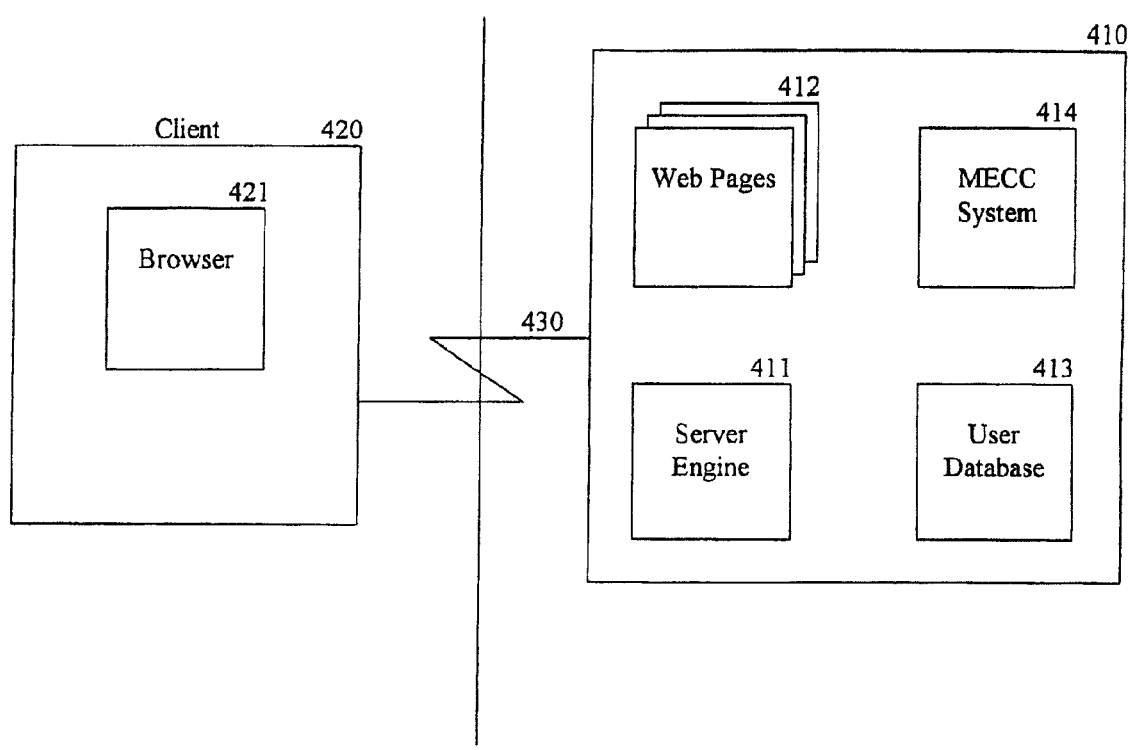
FIG. 4 is a block diagram illustrating an embodiment of the present invention.

FIG. 4 is a block diagram illustrating an embodiment of the present invention. This embodiment supports electronic commerce with multiple contexts over the Internet using the World Wide Web. The server system 410 includes a server engine 411, various Web pages 412, a user database 413, and the multiple electronic commerce context ("MECC") system (or multiple shopping cart system in one embodiment). The server engine receives HTTP requests to access Web pages identified by URLs and provides the Web pages to the various client systems. Such an HTTP request may indicate that the purchaser has performed the single action to select a different shopping cart or electronic context. The user database includes purchaser-specific order information such as the name of the user and electronic commerce context ("ECC") profile information for each electronic commerce context. The MECC system contains various components that perform the functions of multiple electronic commerce context. Various components are described below in detail. The client system 420 contains a browser 421. The server and client systems interact by exchanging information via communications link 430, which may include transmission over the Internet.

One skilled in the art would appreciate that the multiple electronic commerce context techniques can be used in various environments other than the Internet. For example, the techniques can be used in a single computer system environment rather than in a client/server environment. Also, various communication channels may be used such as local area network, wide area network, or point-to-point dial up connection. Also, a server system may comprise any combination of hardware or software that can support multiple electronic commerce contexts. A client system may comprise any combination of hardware or software that can interact with the server system. These systems may include television-based systems or various other consumer products through which orders may be placed. In general, the client and server system may include a central processing unit, a memory, and storage devices. The multiple electronic commerce context ("MECC") system may be stored in a computer-readable medium such as memory or a CD-ROM.

FIG. 5 is a block diagram illustrating a sample data structure for storing electronic commerce context ("ECC") profile information. One skilled in the art will appreciate that the many different organizations of data structures could be used. The sample data structure of FIG. 5 contains a user table 501, a context mapping table 502, and a context table 503. In this example, user table 501 contains an entry for each user. Each entry contains a user ID and information describing the user (e.g., user name and email address). For example, one entry represents the user with the user ID of "JSmith." The context mapping table 502 contains an entry for each context for each user. Each entry contains a user ID and a context ID. For example, the user with the user ID of "JSmith" has two contexts identified by context IDs "204" and "220." The context table 503 contains an entry for each context. Each entry contains the context ID and information describing the context (e.g., context name, and billing information). For example, the context identified by the context ID of "204" has the context name of "Johnny's." The tables of this sample data structure may contain many more columns of information. For example, the user table may also contain the address of the user. The multiple electronic commerce context ("MECC") system may access ECC profile information for a user by using the user's user ID to determine the context ID of the user's current context from the context mapping table. The MECC system may then use the retrieved context ID to retrieve the context information for the context table. The sample data structure may also contain activity information describing electronic commerce activity conducted while a user is in each electronic commerce context. This activity information may track items added to a shopping basket, banner advertisements selected, and Web sites visited when in that electronic commerce context. The activity information may be collected by logging and tagging the activity with the current electronic commerce context. The MECC system can then use this collected activity information to, for example, customize advertising or recommendations while the user is in a certain electronic commerce context.

Figure 6:
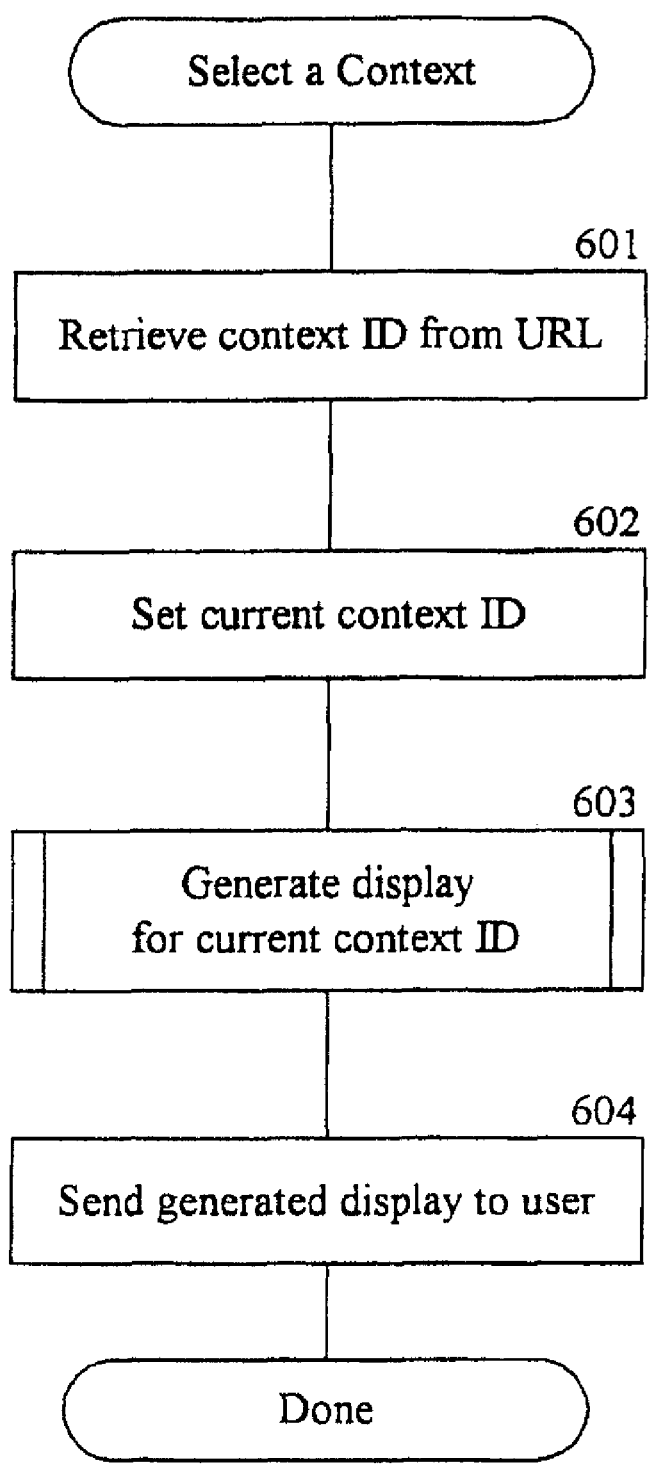
FIG. 6 is a flow diagram of a routine that processes the selection of the new electronic commerce context.

FIGS. 6-11 illustrate one embodiment of various components of the multiple electronic commercial context ("MECC") system in the WWW environment. FIG. 6 is a flow diagram of a routine that processes the selection of the new electronic commerce context. In one embodiment, when a user selects a new context from a shopping cart selection navigation bar, a URL is sent to the server computer system. That URL contains information identifying the new context. This routine performs the processing to switch the electronic commerce context and generate the appropriate displays. In step 601, the routine retrieves the context ID (or other identifying information) from the URL received from the client. In step 602, the routine sets the current context ID for the user. In step 603, the routine generates a display (e.g., and HTML document) for the current context. The generation of the display is described in detail in FIG. 7. In step 604, the routine sends the generated display to the user's client system. The routine then completes.

Figure 7:
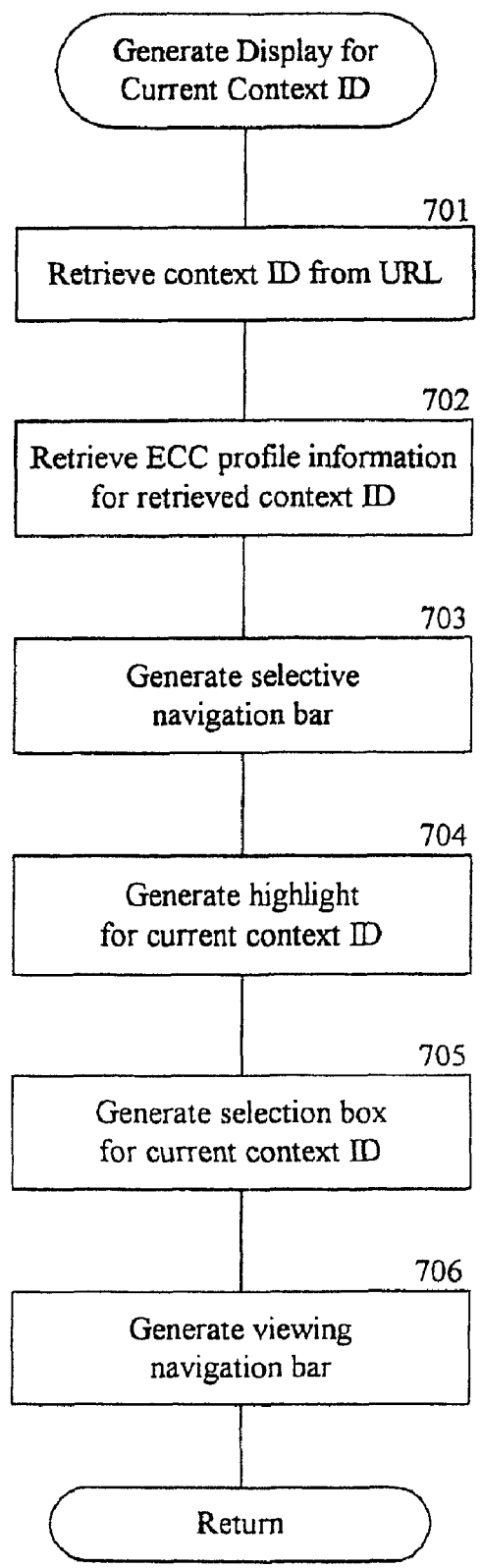
FIG. 7 is a flow diagram of a routine that generates a display for the current context.

FIG. 7 is a flow diagram of a routine that generates a display for the current context. This routine retrieves the electronic commerce context ("ECC") profile information for the current context ID and generates the display accordingly. In this embodiment, the generated display is described in a HTML document. In step 701, the routine retrieves the current context ID for the user. In step 702, the routine retrieves the ECC profile information for the retrieved context ID. In step 703, the routine generates a context selection navigation bar (e.g., the shopping cart selection navigation bar) that identifies each of the contexts for the user. In step 704, the routine highlights the current context on the generated selection navigation bar. In step 705, the routine generates the selection box in accordance with the ECC profile information for the current context ID. In step 706, the routine generates the context viewing navigation bar (e.g., shopping cart viewing navigation bar) based on the retrieved ECC profile information. The routine then returns.

Figure 8:
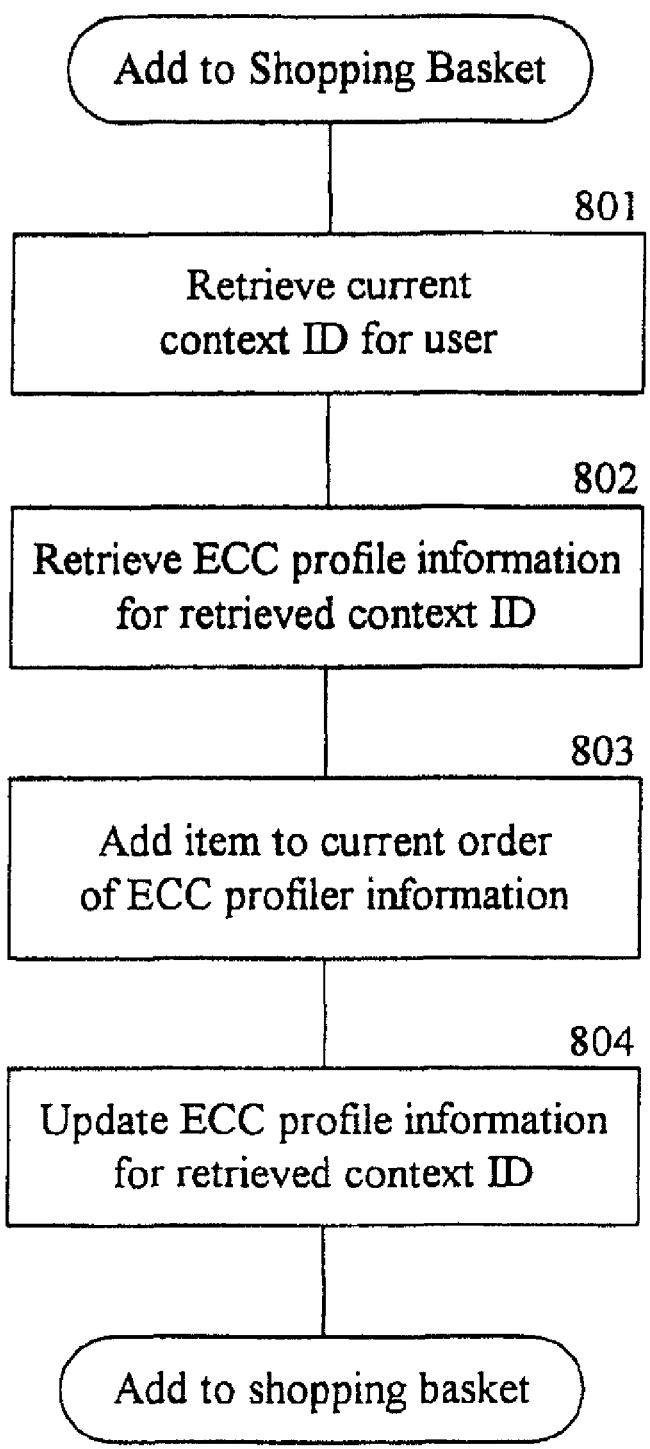
FIG. 8 is a flow diagram of a routine that adds an item to the shopping cart for the currently selected context.

FIG. 8 is a flow diagram of a routine that adds an item to the shopping cart for the currently selected context. This routine is invoked when a user selects the add-to shopping cart button. In step 801, the routine retrieves the current context ID for the user. In step 802, the routine retrieves the electronic commerce context ("ECC") profile information for the current context ID. In step 803, the routine adds the item to the shopping cart for the current context ID within the retrieved ECC profile information. In step 804, the routine updates the ECC profile information for the current context ID in the user database. The routine then completes.

Figure 9:
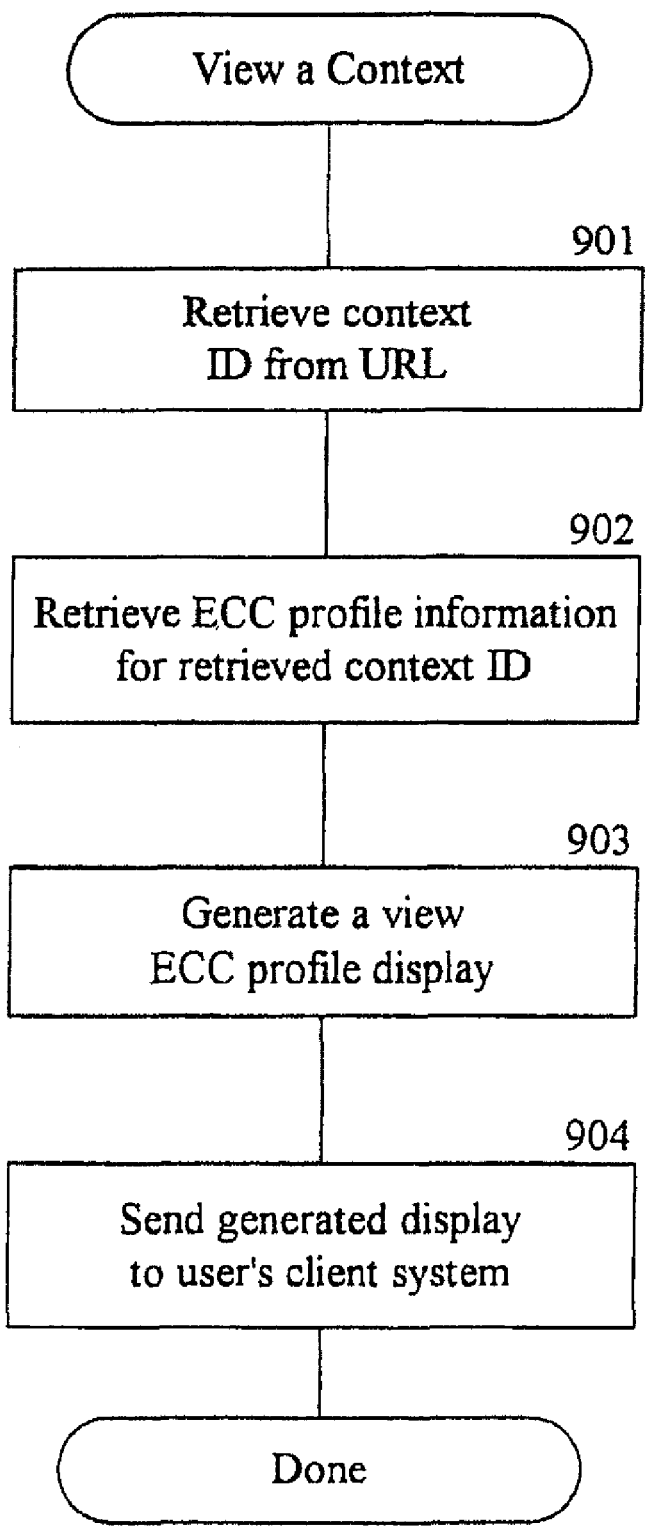
FIG. 9 is a flow diagram of a routine that processes a request to view electronic commerce context ("ECC") profile information for a context.

FIG. 9 is a flow diagram of a routine that processes a request to view electronic commerce context ("ECC") profile information for a context. This routine is invoked when a user selects the context viewing navigation bar. In step 901, the routine retrieves the context ID (or other identifying information such as user ID and session ID) from the URL associated with the selected portion of the viewing navigation bar. In step 902, the routine retrieves the ECC profile information for the retrieved context ID. In step 903, the routine generates a display for the retrieved ECC profile information. In step 904, the routine sends the generated display for the user's client computer system. The routine then completes.

Figure 10:
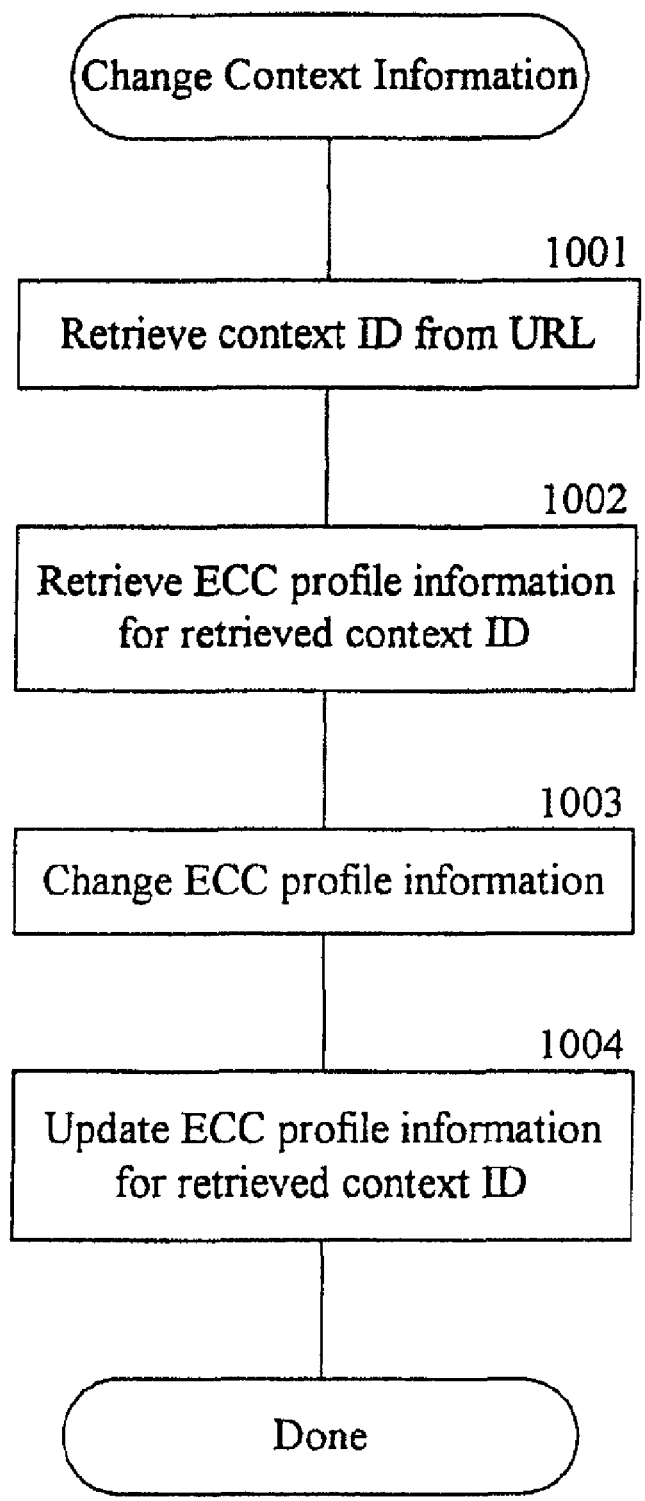
FIG. 10 is a flow diagram of a routine for updating electronic commerce context ("ECC") profile information.

FIG. 10 is a flow diagram of a routine for updating electronic commerce context ("ECC") profile information. This routine is invoked when a user indicates to change any of the ECC profile information. For example, this routine is invoked when a user changes shipping information or the identifier on a context. In step 1001, the routine retrieves the context ID from the URL. Alternatively, the context ID can be retrieved from a mapping of a certain key (e.g., ID or user ID) to context ID. In step 1002, the routine retrieves the ECC profile information for the retrieved context ID. In step 1003, the routine changes the ECC profile information. In step 1004, the routine updates the ECC profile information for the retrieved context ID in the user database. The routine then completes.

Figure 11:
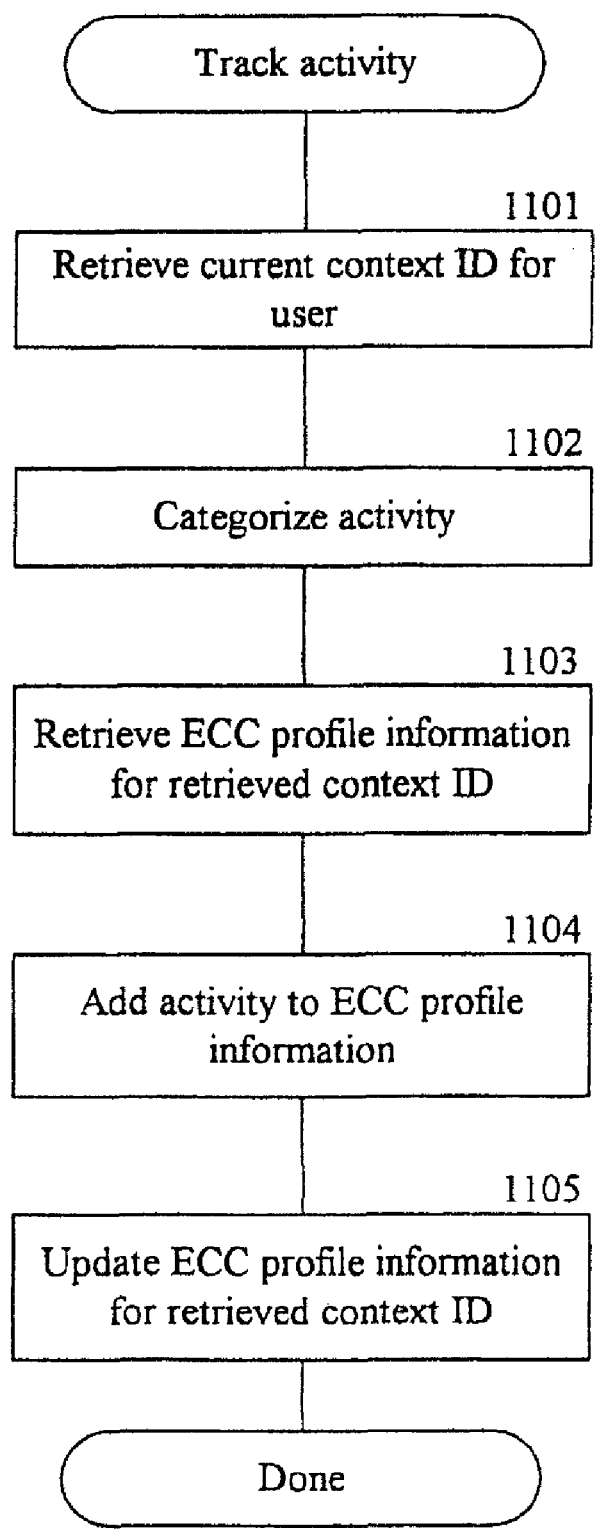
FIG. 11 is a flow diagram of a routine that stores information on the activities of a user.

FIG. 11 is a flow diagram of a routine that stores information on the electronic commerce activity of a user. The multiple electronic commerce context ("MECC") system may track various user activity that occurs while in each context. For example, the MECC system may track items that the user viewed, items that the user purchased, or links that the user assessed while in a context. In step 1101, the routine retrieves the current context ID for the user. In step 1102, the routine categorizes the electronic commercial activity (e.g., "viewing" or "selecting" an item). In step 1103, the routine retrieves the electronic commerce context ("ECC") profile information for the current context ID for the categorization. In step 1104, the routine updates the activity information to the ECC profile information. In step 1105, the routine updates the ECC profile information for the current context ID. The routine then completes.

Another embodiment of the present invention provides a method and system for limiting the scope of the electronic commerce that may be conducted while in an electronic commerce context ("ECC"). For example, if the electronic commerce is the purchasing of video tapes, then the user, when purchasing video tapes for a child, may want to limit displaying of information to only those video tapes with a family-oriented rating ("G"). The multiple electronic commerce context ("MECC") system limits the scope of electronic commerce by allowing the user to define filters that can be applied to an ECC. For example, the items available to be purchased may have various attributes (e.g., cost, rating, or general categorization such as documentary) associated with them. The MECC system may input from the user a series of filter criteria that specify the values of attributes, such as "rating=G," that each item must have in order to be within the scope of the electronic commerce conducted within an ECC. Filters may be particularly useful to limit the scope of electronic commerce conducted by a child. Also, filters may be password protected so that, for example, a child does not change the filter. In one embodiment, the MECC system stores the filter criteria along with the profile information for each electronic commerce context. One skilled in the art will appreciate that the filter criteria can be specified using various well-known techniques, such as listing a series of logic conditions for the attributes using logical-ANDs and logical-ORs. The MECC system may alternatively apply the filter criteria only when an item is In selected, rather than when the information for the item is displayed. In this way, the user may view the information for all the available items, but the MECC system would prevent the purchase of items (or at least warn the user) that do not meet the filter criteria. The MECC system may also provide predefined filters that a user may select for an ECC. For example, a filter may be predefined for a "country theme" if the items available to be purchased are video tapes, music CD's, and clothing. The "country theme" may include the filter criterion "book=western or music=country." In one embodiment, if the electronic commerce is conducted using a search engine to identify those items that the user may want to purchase, then the filter criteria for the ECC may be automatically applied as part of each search for that ECC.

Another embodiment of the present invention provides a method and system for providing multiple interaction contexts for a user interacting with a computer system. Each interaction context has associated information relating to the interaction conducted while the user was in that interaction context. The interaction may be, for example, the conducting of electronic commerce (as described above), the using of a search engine, or the browsing through Web pages. When engaging in such interactions, the user may specify one of the interaction contexts. The system then associates information relating to interaction with the specified interaction context. When a user subsequently engages in interactions while that interaction context is currently specified, the associated information is available to influence the interaction. For example, if the interaction is the use of a search engine, then a user may use one interaction context for home and another interaction context for work. If the user is normally interested in legal documents when at work, then the work interaction context information would relate to legal documents. In contrast, if the user is normally interested in sports documents when at home, then the home interaction context information would relate to sports documents. Thus, when the user inputs a search for the word "court," the search engine may identify an entirely different set of related documents depending on whether the work or home interaction context is currently selected.

From the foregoing it will be appreciated that, although specific embodiments of the invention have been described herein for purposes of illustration, various modifications may be made without deviating from the spirit and scope of the invention. For example, the multiple electronic commerce context ("MECC") system may provide a facility to "reset" a context to default values or to "copy" a context. That is, if a user needs to change certain context information (e.g., billing and shipment information), the user can indicate to "reset" or "copy" a context. When a context is "reset," its information may be reset to certain initial values. When a context is "copied," the information of the context replaces the information of another context. Also, in various embodiments, the shopping cart selection navigation bar can be used for dragging-and-dropping items into the various shopping carts. For example, a user may select an item by depressing a button on a pointing device, then drag the selected item to the selection navigation bar, and drop the item into a shopping cart by releasing the button. When an item is dragged-and-dropped into a shopping cart, the MECC system may also change the currently selected shopping cart to the shopping cart into which the item has been dropped or maintain the current selection of a shopping cart. Also, a shopping cart (or more generally an aggregation) can function as a gift registry. That is, a user can select one or more items to be placed in a shopping cart, and the shopping cart can be provided to other users. The other users can purchase a registered item from the shopping cart using the shipment information of the shopping cart but the other user's billing information. Once items are purchased, the gift registry is updated accordingly. Also, a user's electronic commerce context can be provided to other users so that recommendations for gifts for the user based on electronic commerce context profile information can be provided to the other users. The term "user" as used herein refers to any entity that may use a computer system, such as a person, another computer system, or computer program. In addition, the user may operate on behalf of an organization with an account for conducting electronic commerce. Thus, the user ID may be an account ID for the organization or division of the organization. Accordingly, the invention is not limited except as by the appended claims.

The invention claimed is:

1. A method in a computing system for conducting electronic commerce, comprising:
   establishing an account for conducting electronic commerce for an organization, the established account including payment information usable to obtain payment for electronic commerce activities of any of a plurality of persons associated with the organization; and
   for each of the plurality of persons associated with the organization:
      establishing an electronic commerce context for the person;
      displaying an indication of items stored in the electronic commerce context, the items including items selected by the person that have not been ordered;
      storing in connection with the electronic commerce context an indication of items ordered by the person and items selected by the person that have not been ordered, and associated information relating to interactions engaged while the person is conducting electronic commerce activities in the electronic commerce context; and
      using the stored information in connection with the person's electronic commerce activities while the person is conducting the electronic commerce activities; and
   providing, to a user of the account for conducting electronic commerce for the organization, access to the electronic commerce context of at least one other person in the organization.

2. The method of claim 1 wherein the organization is a family, and each of the plurality of persons associated with the organization is a member of the family.

3. The method of claim 1 wherein available electronic commerce activities include browsing within a set of items, and wherein information is stored for a person of the plurality that restricts the items of the set that may be browsed by the person.

4. The method of claim 1 wherein the electronic commerce activities include ordering items among a set of items, and wherein information is stored for a person of the plurality that restricts the items of the set that may be ordered by the person.

5. The method of claim 1 wherein information is stored for each person of the plurality identifying items that the person has ordered, and wherein, for each person of the plurality, the stored information is used, to the exclusion of information stored for other people of the plurality, to select items to recommend to the person.

6. The method of claim 1 wherein information is stored for each person of the plurality identifying items that the person has browsed, and wherein, for each person of the plurality, the stored information is used, to the exclusion of information stored for other people of the plurality, to select items to recommend to the person.

7. The method of claim 1 wherein information is stored for each person of the plurality identifying items that the person has ordered, and wherein, for each person of the plurality, the stored information is used to display a list of items including only items that the person has ordered.

8. The method of claim 1 wherein information is stored for each person of the plurality specifying shipping information for the person, and wherein, for each person of the plurality, the shipping information specified by the stored information is used to ship items ordered by the person.

9. A computer-readable medium whose contents cause a computing system to perform a method for conducting electronic commerce, the method comprising:
   establishing an account for conducting electronic commerce for an organization, the established account including payment information usable to obtain payment for electronic commerce activities of any of a plurality of persons associated with the organization; and
   for each of the plurality of persons associated with the organization:
      establishing an electronic commerce context for the person;
      storing in connection with the electronic commerce context information relating exclusively to the person's electronic commerce activities;
      displaying an indication of items currently stored in the electronic commerce context, the items including items selected by the person but have not been ordered;
      storing information identifying items that the person has ordered and items selected by the person that have not been ordered, and associated information relating to interactions engaged while the person is conducting electronic commerce activities in the electronic commerce context; and
      using the stored information in connection with the person's electronic commerce activities while the person is conducting the electronic commerce activities; and
   providing, to a user of the account for conducting electronic commerce for the organization, access to the electronic commerce contexts of the persons in the organization, the providing including generating, for the user of the account for conducting electronic commerce for the organization, a display of the electronic commerce context of at least one other person in the organization without the at least one other person submitting said electronic commerce context to the user.

10. The computer-readable medium of claim 9 wherein the organization is a family, and each of the plurality of persons associated with the organization is a member of the family.

11. The computer-readable medium of claim 9 wherein available electronic commerce activities include browsing within a set of items, and wherein information is stored for a person of the plurality that restricts the items of the set that may be browsed by the person.

12. The computer-readable medium of claim 9 wherein the electronic commerce activities include ordering items among a set of items, and wherein information is stored for a person of the plurality that restricts the items of the set that may be ordered by the person.

13. The computer-readable medium of claim 9 wherein information is stored for each person of the plurality identifying items that the person has ordered, and wherein, for each person of the plurality, the stored information is used to select items to recommend to the person.

14. The computer-readable medium of claim 9 wherein information is stored for each person of the plurality identifying items that the person has browsed, and wherein, for each person of the plurality, the stored information is used, to the exclusion of information stored for other people of the plurality, to select items to recommend to the person.

15. The computer-readable medium of claim 9 wherein information is stored for each person of the plurality identifying items that the person has ordered, and wherein, for each person of the plurality, the stored information is used, to the exclusion of information stored for other people of the plurality, to display a list of items including only items that the person has ordered.

16. The computer-readable medium of claim 9 wherein information is stored for each person of the plurality specifying shipping information for the person, and wherein, for each person of the plurality, the shipping information specified by the stored information is used to ship items ordered by the person.

17. The method of claim 1 wherein the associated information comprises information relating to items viewed by the person while the person is conducting electronic commerce activities within the electronic commerce context.

18. The method of claim 1 wherein the associated information comprises information relating to searches conducted by the person while the person is conducting electronic commerce activities within the electronic commerce context.

19. The method of claim 1 wherein the stored information is used to generate a recommendation for an item to the person while the person is conducting electronic commerce activities within the electronic commerce context.

20. The method of claim 1 wherein the stored information is used to provide a recommendation for an item to another person in the organization.

21. The computer-readable medium of claim 9 wherein the associated information comprises information relating to items viewed by the person while the person is conducting electronic commerce activities within the electronic commerce context.

22. The computer-readable medium of claim 9 wherein the associated information comprises information relating to searches conducted by the person while the person is conducting electronic commerce activities within the electronic commerce context.

23. The computer-readable medium of claim 9 wherein the stored information is used to generate a recommendation for an item to the person while the person is conducting electronic commerce activities within the electronic commerce context.

24. The computer-readable medium of claim 9 wherein the stored information is used to provide a recommendation for an item to another person in the organization.

* * * * *